United States Patent [19]

Winterbotham

[11] 4,438,341

[45] Mar. 20, 1984

[54] METHOD OF AN APPARATUS FOR VARYING THE LOAD ON AN A.C. GENERATOR

[76] Inventor: Harold Winterbotham, Fern Howe, Braithwaite, Keswick, Cumbria, England, CA12

[21] Appl. No.: 343,882

[22] Filed: Jan. 29, 1982

[51] Int. Cl.³ .............................................. H02P 5/40
[52] U.S. Cl. ...................................... 290/44; 322/29; 322/35
[58] Field of Search ..................... 290/44, 55; 322/29, 322/35, 94; 318/302

[56] References Cited

U.S. PATENT DOCUMENTS

| | | | |
|---|---|---|---|
| 3,034,034 | 5/1962 | Lewis et al. | 322/23 |
| 3,388,585 | 6/1983 | Nola | 290/44 |
| 4,059,771 | 11/1977 | Jacobs et al. | 290/44 |
| 4,059,772 | 11/1977 | Wilkerson | 290/44 |
| 4,095,120 | 6/1978 | Moran et al. | 290/44 |
| 4,146,264 | 3/1979 | Korzeniewski | 290/44 |
| 4,179,729 | 12/1979 | Stanton et al. | 322/4 |
| 4,198,572 | 4/1980 | Kant | 290/44 |
| 4,242,628 | 12/1980 | Mohan et al. | 290/44 |
| 4,395,669 | 7/1983 | Berna et al. | 322/35 |

Primary Examiner—G. Z. Rubinson
Assistant Examiner—Shelley Wade

[57] ABSTRACT

The variation of the load on a wind-driven A.C. generator (16) in accordance with a predetermined law which relates the load to the speed of rotation, is achieved by detecting the period of each half cycle with the aid of a timing unit (10), calculating the percentage conduction required in each half cycle in accordance with the predetermined mathematical law, and using the calculated result to gate a pair of thyristors (12, 14) to conduct for said calculated percentage in alternate half cycles so as to pass a unidirectional current to said load. By variation of conduction during each half cycle the effective resistance of the load can be matched to the voltage output of the A.C. generator over a wide range of speeds. Not only can the efficiency of the system be increased, but the windmill is prevented from being stalled in light breezes.

9 Claims, 6 Drawing Figures

METHOD OF AN APPARATUS FOR VARYING THE LOAD ON AN A.C. GENERATOR

The present invention relates to a method of and apparatus for varying the load on an A.C. generator. More particularly, although not exclusively, it relates to a matching unit for small or medium power wind-driven A.C. generators supplying a resistive load.

Small and medium power wind-driven electrical generating systems commonly run at a rotational speed (RPM) which is directly related to wind speed, whereas the energy available from the wind varies as the cube of the wind speed. A matched load should therefore absorb power in relation to RPM cubed, over a wide range of RPM, and preferably, the matching should be continuous rather than in discrete steps.

A fixed resistive load absorbs power at a rate proportional to the square of the applied electromotive force (EMF). It follows that either the EMF of the A.C. generator must arise as the 3/2 power of the RPM, or the effective resistance (Reff) must vary with RPM. As the former is difficult to achieve in practice, Reff must increase with decreasing RPM at a rate which depends on the EMF/RPM characteristic of the A.C. generator.

The principle of operation is that the connection between the A.C. generator and a fixed resistive load (R) is interrupted by an electronic gate in such a manner that the load R is connected to the generator for a time period (T) once in every cycle or half cycle of the applied EMF. The time period of one cycle will be denoted P.

The absorbed power versus RPM characteristic of the A.C. generator—matching unit—load part of the system can be matched to any windmill with any characteristics by suitably varying:

(a) the wave-form of the applied EMF,
(b) the time T, which can remain constant or vary with RPM,
(c) the phase relation between P and T, for example the period T may begin or end at the start or end of a half cycle, or not.

According to a first aspect of the present invention there is provided a method of varying the load on an A.C. generator in accordance with the speed of rotation thereof, including the steps of: detecting the period of each half cycle of the generator; calculating the percentage of conduction required in each half cycle in accordance with a predetermined law which relates the load to the speed of rotation; and gating the current flow to the load in each following half cycle in accordance with the percentage of conduction calculated.

According to a second aspect of the present invention there is provided apparatus for varying the load on an A.C. generator in accordance with the speed of rotation thereof, including: means for detecting the period of each half cycle of the generator; means for calculating the percentage conduction required in each half cycle in accordance with a predetermined law which relates the load to the speed of rotation; and means for gating the current flow to the load in each following half cycle in accordance with the percentage of conduction calculated.

The preferred gating means may be a pair of thyristors whose gates are controlled in alternate half cycles in accordance with the percentage of conduction calculated. Alternatively, four thyristors are formed into a bridge circuit, diametrically opposite pairs being arranged to be controlled together in alternate half cycles.

Before commencing with the actual description of the preferred embodiment and its operation, it will be helpful to the understanding of the present invention to consider the following mathematical explanation.

It may readily be shown that, if Reff is defined as that resistance which would if the EMF were to be applied over the whole period P absorb the same energy as that actually absorbed whilst the EMF is applied for the period T to the actual resistance R, then:

$$\frac{Reff}{R} = \frac{\text{integral over time period } P \text{ of } e^2}{\text{integral over time period } T \text{ of } e^2}$$

where e is the instantaneous amplitude of the applied EMF.

The value of this ratio for three common types of applied EMF is as follows:

(a) e substantially constant over $\frac{1}{2}$ P $$\frac{Reff}{R} = \frac{\frac{1}{2}P}{T}$$

(b) e = E sin pt $$\frac{Reff}{R} = \frac{\pi/2}{\frac{T}{2} - \frac{\sin 2T}{4}} \text{ where } T \text{ is in radians}$$

where T is in radians (c) e = [a constant times t] up to t = $\frac{1}{4}$P then decreasing at the same rate (a triangular waveform)

$$\frac{Reff}{R} = \frac{1}{3}\left(\frac{\frac{1}{2}P}{(T)}\right)^3$$

up to $\frac{1}{4}$P then $$\frac{1}{1-\frac{4}{3}\left(1-\frac{T}{\frac{1}{2}P}\right)^3}$$

The way in which Reff/R is required to vary with RPM depends on the windmill and the A.C. generator characteristics. For example, if the A.C. generator has a linear EMF/RPM characteristic over the range of interest and the power absorbed from the windmill is required to vary as the cube of RPM, the required ratio Reff/R is a constant times the period P. The required relationship between T and P is found by setting the value of Reff/R which is necessary to provide the desired variation of absorbed power equal to the Reff/R appropriate to the type of applied EMF.

For example, if the first case (a) above applies (e substantially constant) and Reff/R is to be a constant times P, then $$\frac{\frac{1}{2}P}{T} = \text{constant times } P$$

so that the time T is a constant, independent of P.

The application of the above method will now be described for a particular case in which Reff/R is to be a constant times the period, P, and the waveform is substantially triangular. It will be appreciated that many other different examples could be given.

Application of the correct formula (c) above leads to an expression for T in $P^{\frac{1}{2}}$. However, over the range of interest a sufficient approximation is given by $$T = f + gP$$

where f and g are constants.

For simplicity of exposition the following values, which would be typical, are assumed:
Range of operation: 10 to 100 Hz input frequency
Desired range to Reff/R: 10:1.
Clock pulse rate: 20 kilobauds
It follows that, since T is to be closed to $\frac{1}{2}$P at maximum input frequency (P=10 mS), the approximate formula for T is $$T = 2.5 + \frac{1}{4}(\frac{1}{2}P)$$

Times are quoted in milliseconds (mS).

The present invention will now be described in greater detail by way of examples with reference to the accompanying drawings, wherein:

FIG. 1A if a block diagram of one form of matching unit for varying the load on an A.C. generator;

Figure 1A:
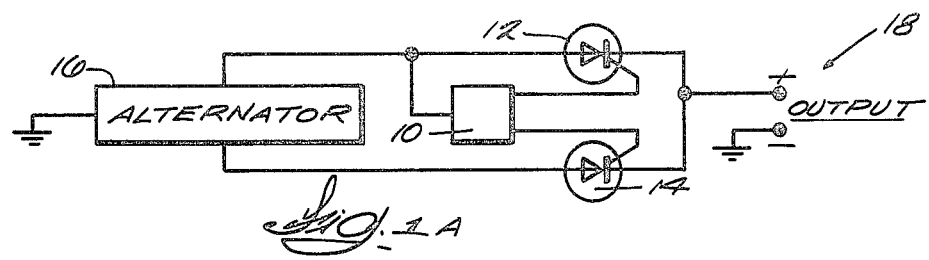
FIG. 1B is a block diagram of an alternative form of matching unit using a full wave rectifier bridge.

Referring first to FIG. 1A, the matching unit comprises a timing unit 10 and a pair of thyristors 12 and 14. The output from an A.C. generator 16 supplies a unidirectional output 18 through the thyristors 12 and 14. The gate electrodes of the thyristors are controlled from the timing unit 10 and caused to conduct alternately in alternate half cycles for a given period in each half cycle depending on the speed of rotation of the A.C. generator.

Figure 1B:
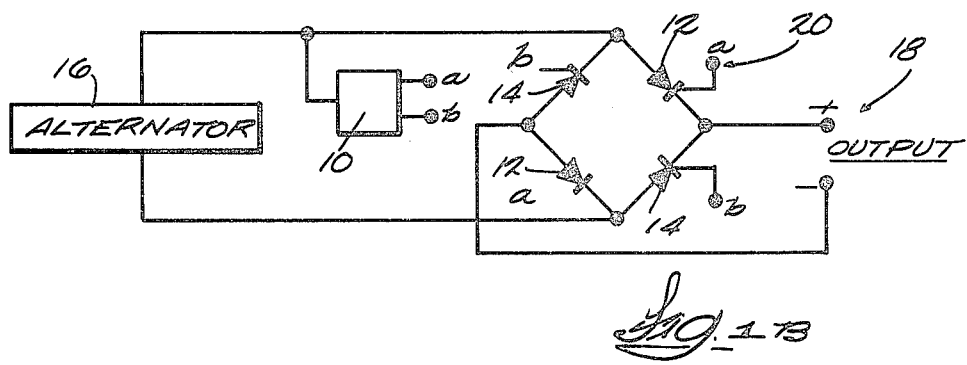

In the alternative circuit shown in FIG. 1B, instead of the centre point of the windings of the A.C. generator being earthed, the output is supplied to a full wave rectifier bridge 20 consisting of four thyristors. A pair of opposite thyristors have their gate electrodes connected to one output of the timing unit 10, whilst the other pair of thyristors have their gate electrodes connected to the second output of the timing unit 10.

In preferred form the thyristors shown in FIGS. 1A and 1B are silicon controlled rectifiers. As is well known, such devices require a triggering voltage applied to the gate electrode in order to fire them, after which they remain conductive until the voltage across them falls to zero, where after they have to be retriggered into conduction.

Figure 3:
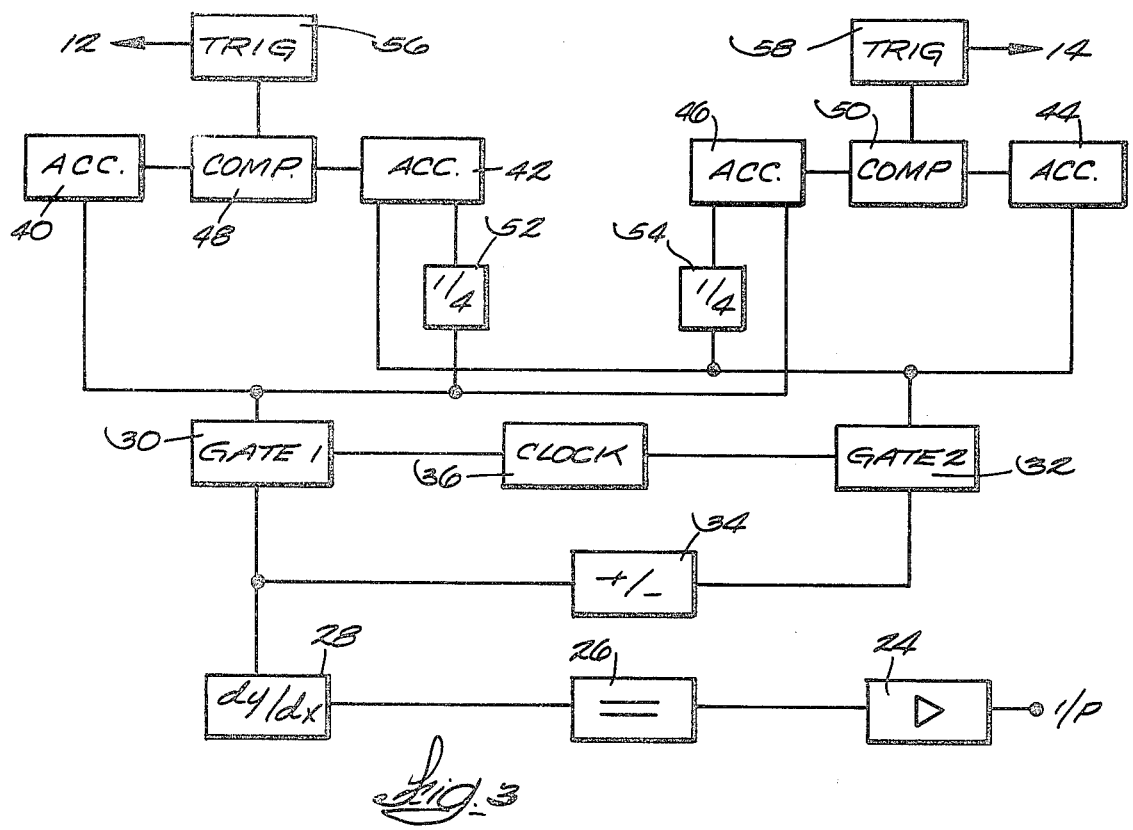
FIG. 3 is a detailed block diagram of the timing circuit shown in FIG. 1A.

The timing unit 10 is shown in greater detail in FIG. 3. The output from the A.C. generator is applied to a zero crossing detecting comprising units 24, 26 and 28 which outputs pulses of alternate polarity at the times of zero crossing. The A.C. output voltage is amplified in an amplifier 24, limited in a limiter 26 and finally differentiated in a differentiator 28. The output from the differentiator 28 is applied directly to a first gate circuit 30, and to a second gate circuit 32 through an inverter 34.

The gates 30 and 32, which are identical, are opened by pulses of one polarity and closed by pulses of opposite polarity. Thus, due to the presence of the inverter 34, the gates 30 and 32 are open in alternate half-cycles, and thus operate in anti-phase.

Timing pulses supplied by a clock pulse generator 36 are permitted to pass through the gates 30 and 32 when open.

The timing circuit also includes four accumulators 40, 42, 44 and 46, two comparators 48 and 50, two divide-by-four circuits 52 and 54 and two trigger circuits 56 and 58 which supply outputs to the gate electrodes of the thyristors 12 and 14 in FIG. 1A or opposite pairs of thyristors in the bridge circuit 20 of FIG. 1B.

The output from the gate 30 is applied to the accumulator 40, one input of the accumulator 46 and also to the input of the divide-by-four circuit 52. In similar manner, the output from the gate 32 is applied to the accumulator 44, one input of the accumulator 42 and also to the input of the divide-by-four circuits 54 the outputs of the two divide-by-four circuits 52 and 54 are applied to the second inputs of the respective accumulators 42 and 46.

The first comparator 48 compares the outputs from the first pair of accumulators 40 and 42, whilst the second comparator 50 compares the outputs from the second pair of accumulators 44 and 46. When equality in the counts stored in the respective pairs of accumulators is detected, the comparators 48 and 50 energize the respective trigger circuits 56 and 58, to fire the respective thyristors. The accumulators 40 to 46 count, and retain until they are cleared, the number of pulses received either in analog or digital form.

Figure 2A:
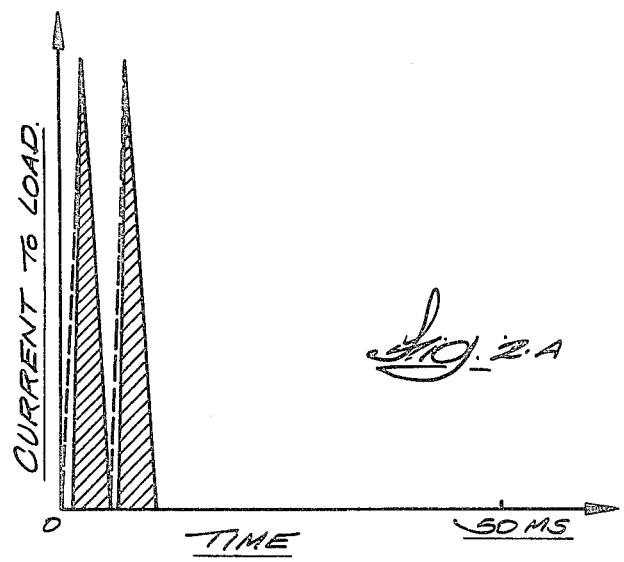
FIGS. 2A and 2B are graphs illustrating the percentage current flow for each half cycle in the cases where $\frac{1}{2}$P=5 mS and $\frac{1}{2}$P=50 mS respectively.
Figure 2B:
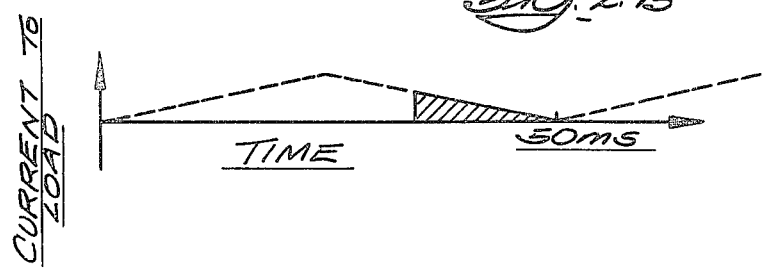
Figure 4:
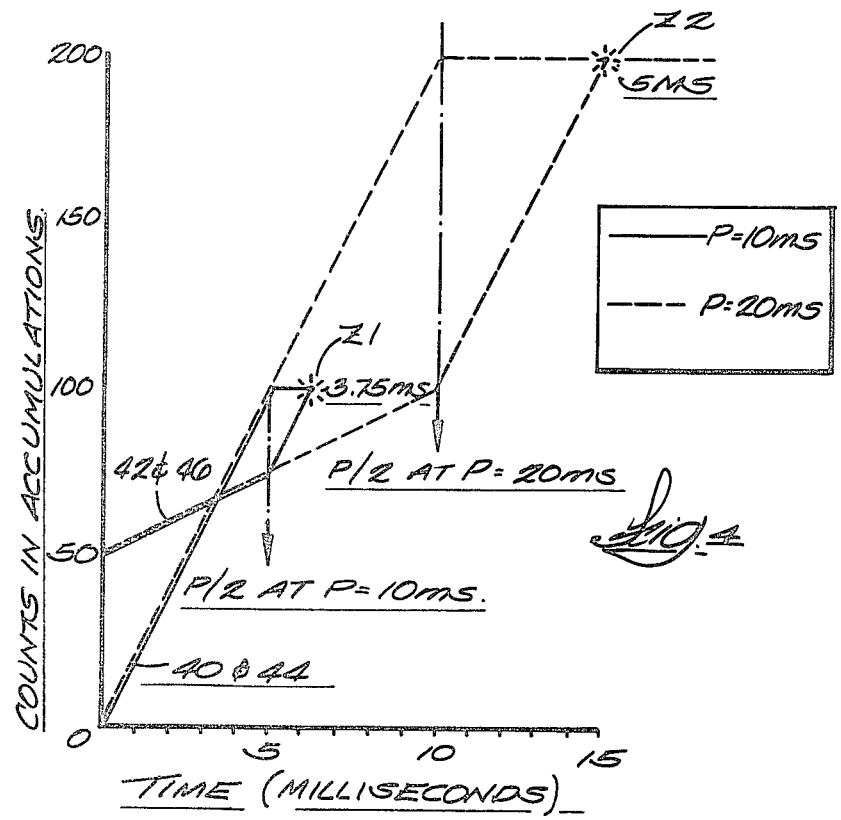
FIG. 4 is a graphical representation of the counts collected in the timing circuit shown in FIG. 3 for periods of 10 and 20 mS respectively.

The practical results of the matching unit are shown in FIGS. 2 and 4. FIGS. 2A and 2B illustrate the current output to the load plotted against a base of 0 to 50 mS for two fairly extreme cases, the first being the case of $\frac{1}{2}$P=5 mS (a fresh breeze or strong wind) and the second being the case of $\frac{1}{2}$P=50 mS (a light breeze). In the case of FIG. 2A, there are ten half cycles over the 50 mS period. The point in each half cycle at which the thyristors fire is fairly early in the cycle, about a sixth of the half cycle, and the maximum current is high. In the case of FIG. 2B, there is only one half cycle in the 50 mS, and the point in the half cycle where the thyristor fires is after the maximum point in the waveform. Also the maximum current value is less than one tenth of the peak value shown in FIG. 2A. The shaded areas in ach case thus indicate the power absorbed by the load. Only two half cycles have been shown in FIG. 2A for the sake of clarity.

The operation of the timing circuit shown in FIG. 3 will now be described in greater detail in conjunction with the graphical representation shown in FIG. 4.

The accumulators 40 and 44 which have a single input, serve to measure the time $\frac{1}{2}$P, retaining the count until cleared at some point in the next following half cycle, after the associated trigger circuit has been actuated. It should be noted that the reset inputs to the accumulators have been omitted for the sake of clarity.

If, for example, P is 10 mS at a given time, the accumulator 40 will collect 100 counts in the first half cycle, as will be evident from FIG. 4.

The accumulators 42 and 46 similarly collect counts, but have two inputs and a preset number of counts which are always retained. The input to the accumulators 42 and 46 comes from the opposite gates 32 and 30 respectively. When the gate 32 opens for the second half cycle, the accumulator 42 begins therefore to collect counts at the same rate (100 counts in a half cycle). The other input comes from the first half cycle gate 30 via the divide-by-four circuit 52 which passes on 1 count for every 4 received. The divide-by-four function represents the ¼ factor in the formula for T, and the preset counts represent the constant part of the formula for T, that is 2.5 mS or 50 counts. Both those functions may be made variable, in order to produce any desired loading characteristic.

Whilst, therefore, the accumulator 40 is counting at the full rate, the accumulator 42 having started with 50 counts, is adding counts at the rate of 5 counts per mS and by the end of the first period will have accumulated 50+25=75 counts. At this point the accumulator 40 shuts off and retains its 100 counts, and the accumulator 42 starts accumulating counts at the full rate of 20 counts per mS.

The accumulator 42 will reach the same total as the accumulator 40 (100 counts) in 1.25 mS from the start of the second half cycle. At this time the comparator 48 senses equality and provides a pulse to the trigger circuit 56. This trigger circuit amplifies this signal to a form suitable to energize the thyristor, which is thus turned on. The same pulse serves to clear both accumulators (except the present total in accumulator 42). The accumulator 42 is disabled from counting until the next synchronizing pulse opens the gate 30. The same operation for the other half cycle is performed by the second gate 32 together with accumulators 44 and 46 and the comparator 50.

For the two cases illustrated in FIG. 4, where P=10 mS and 20 mS respectively, it will be seen that the accumulator 40 or 44 will accumulate counts of 100 and 200 for the respective periods of 5 and 10 mS illustrated. During this period the accumulator 42 or 46 which starts with a count of 50 adds 25 and 50 more counts during the half cycle concerned for the respective periods of 5 and 10 mS. During the next half cycle, which is the one in which the thyristor is to be triggered, the accumulator 40 or 44 adds nothing whereas the accumulator 42 or 46 counts at the full rate. When the counts in the accumulators 40 and 42 or 44 and 46 are equal at the points Z1 and Z2 for the respective 5 and 10 mS periods illustrated, the appropriate thyristor or thyristors is or are triggered to permit current to flow to the load.

The above described circuit is an efficient and effective way of varying a load on an A.C. generator, such as a small or medium sized wind-driven generator used for domestic purposes, e.g. heating swimming pools or greenhouses. A preferred form of wind-driven A.C. generator is disclosed in my British patent application No. 22681/77 (Ser. No. 1,599,909), or European Patent Application No. 81.300780.4 (Publication No. 0058791). These machines because of their special constructional features are ideally suitable as wind-driven generators.

Moreover, due to the matching unit, the A.C. generator is enabled to operate efficiently over a wide range of wind speeds and does not stall in light breezes because of the reduction in load.

I claim:

1. A method of varying the load on an A.C. generator in accordance with the speed of rotation thereof, including the steps of: detecting the period of each half cycle of the generator; calculating the percentage of conduction required in each half cycle in accordance with a predetermined law which relates the load to the speed of rotation; and gating the current flow to the load in each following half cycle in accordance with the percentage of conduction calculated.

2. A method according to claim 1, wherein the calculation of the percentage of conduction required in each half cycle is effected in accordance with the equation $T = f + gP$, where P is the time period of one half cycle, and f and g are constants.

3. A method according to claim 2, wherein the period of each half cycle is detected by detecting the zero crossing points of the output voltage from said A.C. generator.

4. A method according to claim 1, 2, or 3, wherein the current flow to the load is gated by switching on thyristors for the calculated percentage of the conduction period which ends at the end of each half cycle.

5. Apparatus for varying the load on an A.C. generator in accordance with the speed of rotation thereof, including: means for detecting the period of each half cycle of the generator; means for calculating the percentage of conduction required in each half cycle in accordance with a predetermined law which relates the load to the speed of rotation; and means for gating the current flow to the load in each following half cycle in accordance with the percentage of conduction calculated.

6. Apparatus according to claim 5, wherein the gating means comprises a pair of thyristors whose gates are controlled in alternate half cycles in accordance with the percentage of conduction calculated.

7. Apparatus according to claim 5, wherein the gating means comprises four thyristors formed into bridge circuit, diametrically opposite pairs being arranged to be controlled together in alternate half cycles.

8. Apparatus according to claim 6, wherein said calculating means comprises a clock pulse generator, and comprises for each thyristor, a pair of accumulators which accumulate gated counts from said clock pulse generator, and a comparator which will provide an output to trigger the thyristor when said counts are equal, the counts being gated and accumulated in accordance with the formula: $T = f + gP$, where T is the percentage period of conduction in each half cycle, P is time period of one half and f and g are constants.

9. Apparatus according to claim 7, wherein said calculating means comprises a clock pulse generator, and comprises for each opposite pair of thyristors, a pair of accumulators which accumulate gated counts from said clock pulse generator, and a comparator which will provide an output to trigger the opposite pair of thyristors when said counts are equal, the counts being gated and accumulated in accordance with the formula: $T = f + gP$, where T is the percentage period of conduction in each half cycle, P is time period of one half cycle and f and g are constants.

* * * * *